United States Patent
Kim et al.

(10) Patent No.: US 9,557,604 B2
(45) Date of Patent: Jan. 31, 2017

(54) DISPLAY APPARATUS AND METHOD OF MANUFACTURING THE SAME

(71) Applicant: Samsung Display Co., Ltd., Yongin, Gyeonggi-Do (KR)

(72) Inventors: Kyungbae Kim, Yongin-si (KR); Yongwoo Hyung, Suwon-si (KR); Younggoo Song, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 114 days.

(21) Appl. No.: 14/453,735

(22) Filed: Aug. 7, 2014

(65) Prior Publication Data
US 2015/0192809 A1    Jul. 9, 2015

(30) Foreign Application Priority Data
Jan. 6, 2014 (KR) .................. 10-2014-0001305

(51) Int. Cl.
*G02F 1/1337* (2006.01)
*G02F 1/1333* (2006.01)

(52) U.S. Cl.
CPC ... *G02F 1/133753* (2013.01); *G02F 1/133371* (2013.01); *G02F 2001/133761* (2013.01)

(58) Field of Classification Search
CPC .................................................. G02F 1/1337
USPC ........................................ 349/94, 129, 134
See application file for complete search history.

(56) References Cited

U.S. PATENT DOCUMENTS

| 5,273,475 | A  | * | 12/1993 | Oshikawa | G02F 1/133305 |
|           |    |   |         |          | 156/163 |
| 5,280,375 | A  | * | 1/1994  | Tsuda    | G02F 1/133753 |
|           |    |   |         |          | 349/110 |
| 6,696,114 | B1 |   | 2/2004  | Kawatsuki et al. | |
| 6,852,374 | B2 |   | 2/2005  | Mizusaki et al. | |
| 8,184,249 | B2 |   | 5/2012  | Kim et al. | |
| 8,395,736 | B2 |   | 3/2013  | Shin et al. | |
| 2005/0151915 | A1 | * | 7/2005 | Nomura | G02F 1/133711 |
|              |    |   |        |        | 349/141 |
| 2008/0266502 | A1 |   | 10/2008 | Chiu et al. | |
| 2009/0161048 | A1 | * | 6/2009 | Satake | G02F 1/133305 |
|              |    |   |        |       | 349/110 |
| 2009/0195746 | A1 |   | 8/2009 | Chu | |

(Continued)

FOREIGN PATENT DOCUMENTS

| JP | 2010-122253 A | 6/2010 |
| JP | 2010-198046 A | 9/2010 |

(Continued)

*Primary Examiner* — Nimeshkumar Patel
*Assistant Examiner* — Christopher Raabe
(74) *Attorney, Agent, or Firm* — Cantor Colburn LLP

(57) ABSTRACT

A display apparatus includes a display panel which has a curved surface in a first direction and a flat surface in a second direction crossing the first direction, and includes, a first substrate, a second substrate which faces the first substrate, a liquid crystal layer which is disposed between the first and second substrates and includes liquid crystal molecules pre-tilted at predetermined angles with reference to a direction substantially vertical to a plane of the display panel, where the liquid crystal molecules are pre-tilted at the predetermined angles corresponding to cell gaps defined by distances between the first substrate and the second substrate, respectively.

7 Claims, 11 Drawing Sheets

(56) References Cited

U.S. PATENT DOCUMENTS

2012/0020056 A1* 1/2012 Yamagata ......... G02F 1/133308
                                                    362/97.1
2012/0026439 A1   2/2012 Jung et al.
2012/0194753 A1   8/2012 Shin

FOREIGN PATENT DOCUMENTS

| KR | 1020040083127 A | 10/2004 |
| KR | 100958036 B1    | 5/2010  |
| KR | 1020110062599 A | 6/2011  |

* cited by examiner

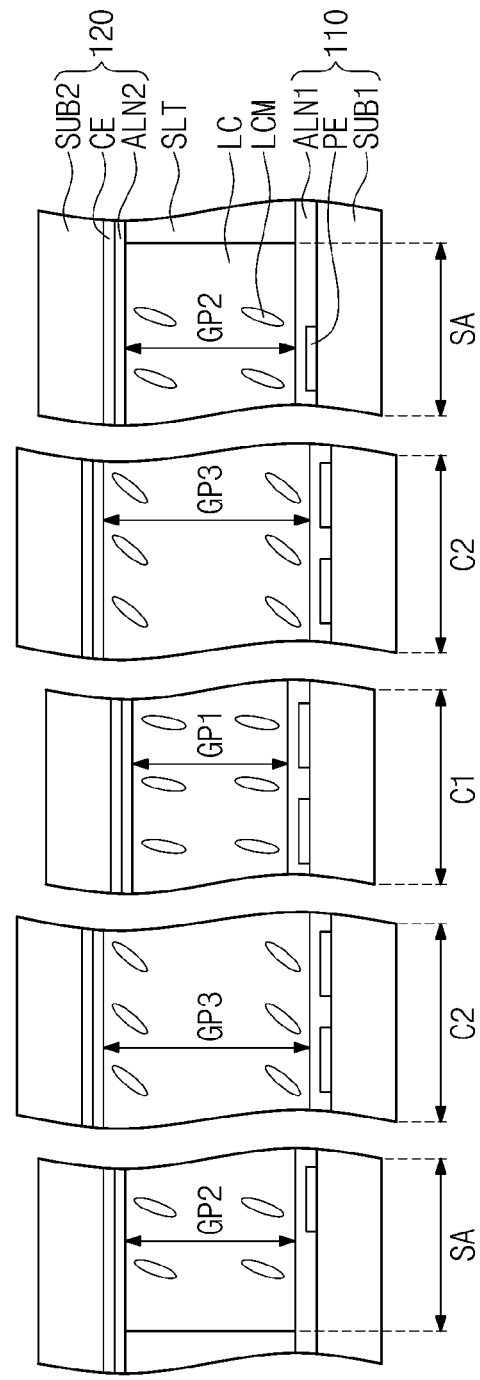

DISPLAY APPARATUS AND METHOD OF MANUFACTURING THE SAME

This application claims priority to Korean Patent Application No. 10-2014-0001305, filed on Jan. 6, 2014, and all the benefits accruing therefrom under 35 U.S.C. §119, the contents of which in its entirety are hereby incorporated by reference.

BACKGROUND

1. Field

The invention relates to a display apparatus improving uniformity in response time of a liquid crystal layer and reliability thereof and a method of manufacturing the display apparatus.

2. Description of the Related Art

In general, a display apparatus includes a display panel to display an image and a backlight unit to supply light to the display panel.

The display panel includes a first substrate including pixels formed thereon, a second substrate disposed to face the first substrate, and an image display layer interposed between the first and second substrates. The image display layer is driven by the pixels, and a transmittance of the light is controlled by the image display layer, thereby displaying a desired image. The image display layer includes various types of layers such as a liquid crystal layer, an electrowetting layer, or an electrophoretic layer.

In general, the display apparatus has a flat plate shape, but in recent years, a display apparatus having a curved shape has been developed. The display apparatus having the curved shape is manufactured by deforming a flat plate-shaped display apparatus to have the curved shape and putting the display apparatus having the curved shape into a case having the curved shape.

SUMMARY

The invention provides a display apparatus capable of improving uniformity in response time of a liquid crystal layer ("LCD") and reliability thereof.

The invention provides a method of manufacturing the display apparatus.

Embodiments of the invention provide a display apparatus including a display panel having a curved surface in a first direction and a flat surface in a second direction crossing the first direction. The display panel includes a first substrate, a second substrate disposed to face the first substrate, and a LCD disposed between the first and second substrates and including liquid crystal molecules pre-tilted at predetermined angles with reference to a direction substantially vertical to a plane of the display panel. The liquid crystal molecules are pre-tilted at the predetermined angles corresponding to cell gaps defined by distances between the first substrate and the second substrate, respectively.

In an exemplary embodiment, the display panel may further include a first center area disposed at a predetermined area of a center portion of the display panel, a side area disposed at a predetermined area of a side portion of the display panel, and a second center area disposed at a predetermined area between the first center area and the side area. The first center area, the second center area and the side area may be arranged in the first direction, and the cell gaps in the first center area, the side area, and the second center area, respectively, are different from each other.

In an exemplary embodiment, the cell gaps may include a first cell gap corresponding to a cell gap of the first center area, a second cell gap corresponding to a cell gap of the side area and greater than the first cell gap, and a third cell gap corresponding to a cell gap of the second center area and greater than the second cell gap.

In an exemplary embodiment, the liquid crystal molecules may be pre-tilted at a first angle corresponding to the first cell gap in the first center area, pre-tilted at a second angle corresponding to the second cell gap in the side area, and pre-tilted at a third angle corresponding to the third cell gap in the second center area.

In an exemplary embodiment, the third angle may be greater than the second angle and the second angle is greater than the first angle.

In an exemplary embodiment, the cell gaps may be gradually increased from the first cell gap to the third cell gap as a distance from the first center area increases and a distance to the second center area decreases, and the cell gaps are gradually decreased from the third cell gap to the second cell gap as a distance from the second center area increases and a distance to the side area decreases.

In an exemplary embodiment, the liquid crystal molecules may be pre-tilted at an angle that gradually increases from the first angle to the third angle as the distance from the first center area increases and the distance to the second center area decreases, and the liquid crystal molecules are pre-tilted at an angle that gradually decreases from the third angle to the second angle as the distance from the second center area increases and the distance to the side area decreases.

Embodiments of the invention provide a method of manufacturing a display apparatus, including preparing a flat display panel including first and second substrates facing each other and a LCD disposed between the first and second substrates, disposing an ultraviolet filter on the flat display panel, irradiating an ultraviolet ray onto the flat display panel through the ultraviolet filter to pre-tilt liquid crystal molecules of the LCD at a predetermined angle with reference to a direction substantially vertical to a plane of the display panel, and deforming the flat display panel to form a curved display panel having a curved surface in a first direction and a flat surface in a second direction crossing the first direction. The liquid crystal molecules are pre-tilted at the angle corresponding to cell gaps defined by distances between the first substrate and the second substrate, respectively.

In an exemplary embodiment, the ultraviolet filter has the thickness inversely proportional to the cell gaps of the curved display panel.

According to the above, the display apparatus may improve the uniformity of the liquid crystal layer and improve the reliability thereof.

BRIEF DESCRIPTION OF THE DRAWINGS

The above and other advantages of the invention will become readily apparent by reference to the following detailed description when considered in conjunction with the accompanying drawings, in which:

FIG. 5 is a view showing liquid crystal molecules of a liquid crystal layer shown in FIG. 3;

DETAILED DESCRIPTION

Figure 1:
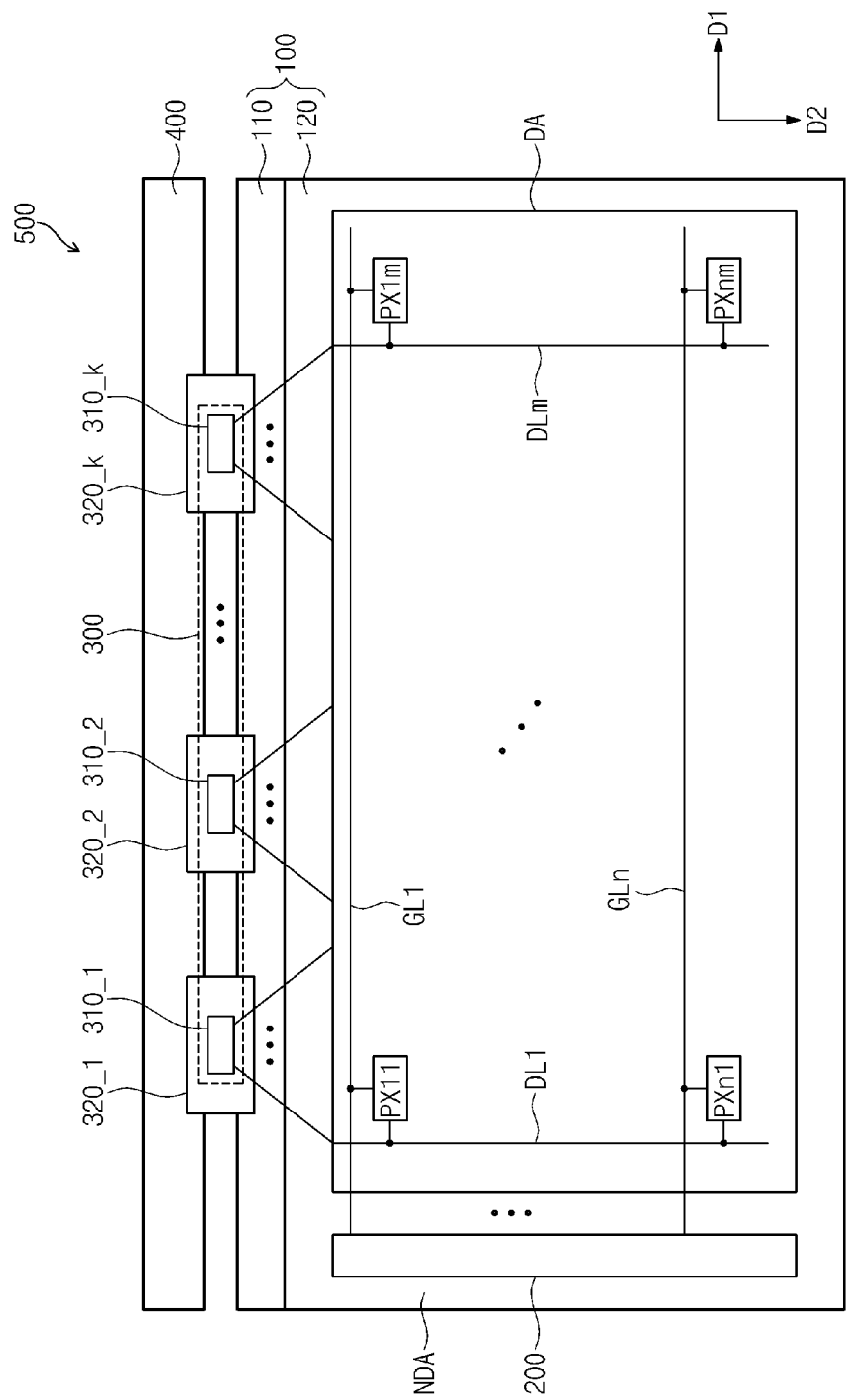
FIG. 1 is a plan view showing an exemplary embodiment of a display apparatus according to the invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

Figure 2:
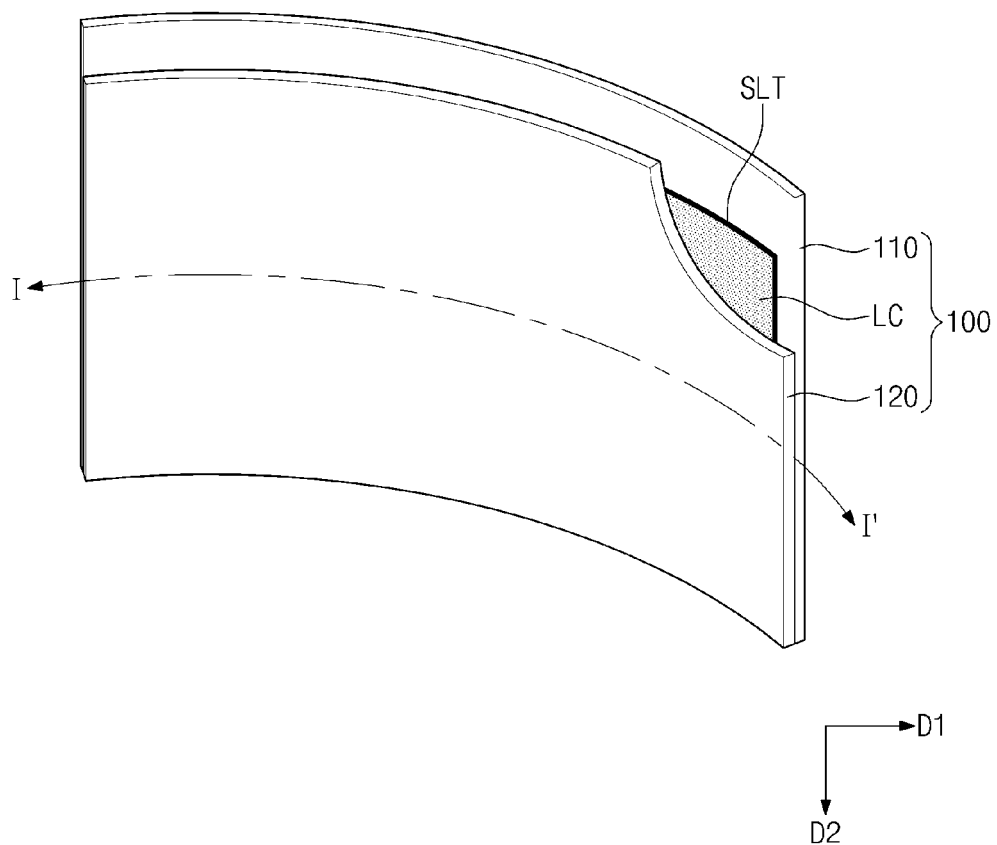
FIG. 2 is a perspective view showing a display panel shown in FIG. 1.

FIG. 1 is a plan view showing a display apparatus according to an exemplary embodiment of the invention and FIG. 2 is a perspective view showing a display panel shown in FIG. 1.

Referring to FIGS. 1 and 2, a display apparatus 500 includes a display panel 100, a gate driver 200, a data driver 300, and a driving circuit board 400.

The display panel 100 has a long side in a first direction D1 and a short side in a second direction D2 crossing the first direction D1. The first direction D1 is substantially perpendicular to the second direction. The display panel 100 includes a display area DA and a non-display area NDA disposed adjacent to the display area DA when viewed in a plan view.

As shown in FIG. 2, the display panel 100 has a curved surface in the first direction D1 and a flat surface in the second direction D2. In an exemplary embodiment, when the display panel 100 is manufactured in a flat shape, the display panel 100 is curved in the first direction D1 to have a predetermined curvature. In the illustrated exemplary embodiment, the display panel 100 may be a curved display panel 100.

The display panel 100 includes a first substrate 110, a second substrate 120 disposed to face the first substrate 110, and a liquid crystal layer LC disposed between the first and second substrates 110 and 120. The first substrate 110 and the second substrate 120 are coupled to each other by a sealant SLT. The sealant SLT is disposed in the non-display area NDA.

The first and second substrates 110 and 120 have the long side in the first direction D1 and have the short side in the second direction D2. The first and second substrates 110 and 120 have the curved surface in the first direction D1 and the flat surface in the second direction D2. Similar to the display panel 100, the first substrate 110 includes the display area DA and the non-display area NDA surrounding the display area DA when viewed in a plan view.

The display panel 100 includes a plurality of pixels PX11 to PXnm, a plurality of gate lines GL1 to GLn, and a plurality of data lines DL1 to DLm, which are disposed on the first substrate 110. The pixels PX11 to PXnm are arranged in a matrix form and disposed in the display area DA. In the exemplary embodiment, each of "m" and "n" is a natural number.

The gate lines GL1 to GLn are insulated from the data lines DL1 to DLm while crossing the data lines DL1 to DLm on the first substrate 110. The gate lines GL1 to GLn are connected to the gate driver 200 to sequentially receive gate signals. The data lines DL1 to DLm are connected to the data driver 300 to receive analog data voltages.

Each of the pixels PX11 to PXnm is connected to a corresponding gate line of the gate lines GL1 to GLn and a corresponding data line of the data lines DL1 to DLm. The pixels PX11 to PXnm receive the data voltages through the data lines DL1 to DLm in response to the gate signals applied through the gate lines GL1 to GLn.

The pixels PX11 to PXnm display gray scales corresponding to the data voltages. In an exemplary embodiment, each of the pixels disposed in the display area DA of the first substrate 110 includes a pixel electrode (not shown) and a thin film transistor ("TFT") (not shown) connected to the pixel electrode. The second substrate 120 includes a common electrode (not shown).

The TFT receives the corresponding data voltage in response to the corresponding gate signal and applies the data voltage to the pixel electrode. The data voltage is applied to the pixel electrode and a common voltage is applied to the common electrode.

An electric field is generated between the pixel electrode and the common electrode due to a difference in voltage between the data voltage and the common voltage. An arrangement of liquid crystal molecules of the liquid crystal layer LC is changed and the transmittance of the light is controlled by the arrangement of the liquid crystal molecules, thereby displaying the desired image.

In an exemplary embodiment, the gate driver 200 may be disposed in the non-display area NDA adjacent to one side of the display area DA. In the exemplary embodiment, the gate driver 200 is mounted on the first substrate 110 in the non-display area NDA disposed adjacent to a left side of the display area DA as an amorphous silicon TFT gate driver circuit, for example.

However, it should not be limited thereto or thereby. In another exemplary embodiment, the gate driver 200 may include a plurality of gate driving chips. The gate driving chips may be mounted on the non-display area NDA disposed adjacent to the left side of the display area DA in a chip on glass ("COG") manner or a tape carrier package ("TCP") manner.

The gate driver 200 generates the gate signals in response to a gate control signal applied from a timing controller (not shown), which is mounted on the driving circuit board 400. The gate signals are sequentially applied to the pixels PX11 to PXnm through the gate lines GL1 to GLn in a unit of a row. Thus, the pixels PX11 to PXnm are driven in the unit of the row.

The data driver 300 includes a plurality of source driving chips 310_1 to 310_k, where "k" is a natural number smaller than "m". Each of the source driving chips 310_1 to 310_k is mounted on a corresponding flexible circuit board of flexible circuit boards 320_1 to 320_k and connected between the driving circuit board 400 and the first substrate 110 in the non-display area NDA disposed adjacent to an upper portion of the display area DA.

In the illustrated exemplary embodiment, the data driver 300 may be connected to the display panel 100 in the TCP manner. However, it should not be limited thereto or thereby. That is, in another exemplary embodiment, the source driving chips 310_1 to 310_k may be mounted in the non-display area NDA disposed adjacent to the upper portion of the display area DA in the COG manner.

The data driver 300 receives image signals and a data control signal from the timing controller. The data driver 300 generates the analog data voltages which correspond to the image signals, in response to the data control signal. The data driver 300 applies the data voltages to the pixels PX11 to PXnm through the data lines DL1 to DLm.

Figure 3:
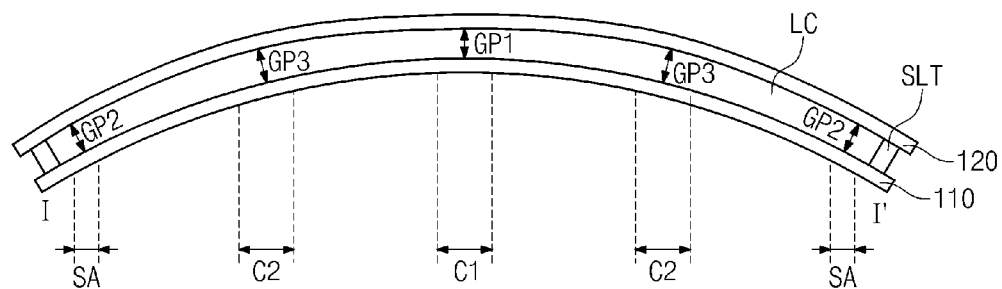
FIG. 3 is a cross-sectional view taken along a line I-I' shown in FIG. 2.
Figure 4:
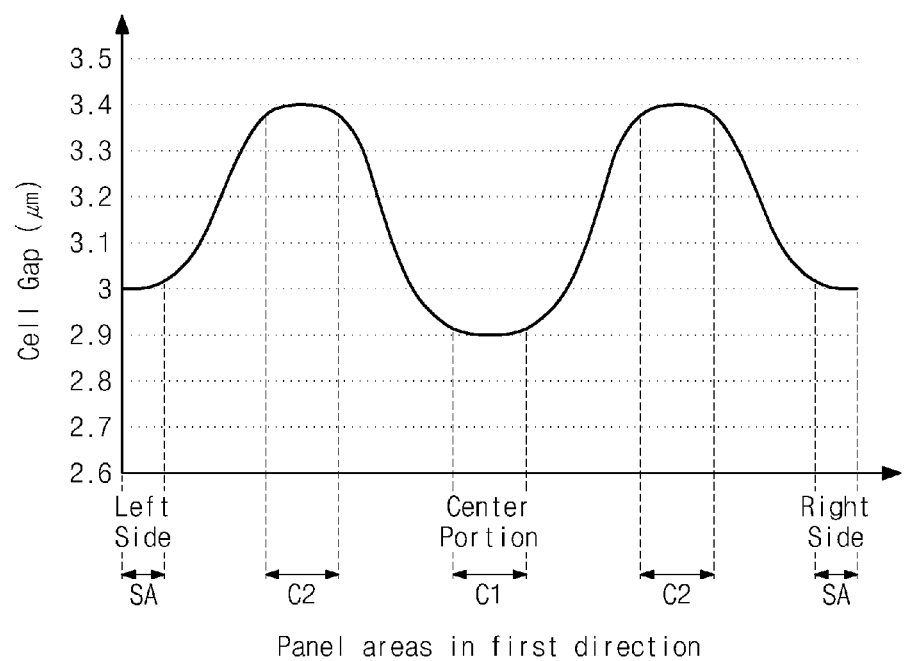
FIG. 4 is a graph showing a cell gap of the display panel shown in FIG. 3.

FIG. 3 is a cross-sectional view taken along a line I-I' shown in FIG. 2, and FIG. 4 is a graph showing a cell gap of the display panel shown in FIG. 3.

Referring to FIGS. 3 and 4, the display panel 100 is curved in the first direction D1 to have a curved surface. When the display panel 100 is curved in the first direction D1 and has the curved surface, a difference in cell gap corresponding to a distance between the first substrate 110 and the second substrate 120 occurs in the display panel 100.

In detail, a predetermined area of a center portion of the display panel 100 in the first direction D1 is referred to as a first center area C1. A distance between the first and second substrates 110 and 120 in the first center area C1 is referred to as a first cell gap GP1. That is, the first center area C1 of the display panel 100 has the first cell gap GP1.

Predetermined areas at left and right sides of the display panel 100 in the first direction D1 are referred to as side areas SA. The side areas SA are disposed at positions adjacent to the sealant SLT. A distance between the first and second substrates 110 and 120 in the side areas SA is referred to as a second cell gap GP2. That is, the side areas SA have the second cell gap GP2. The second cell gap GP2 is greater than the first cell gap GP1.

In the first direction D1 of the display panel 100, a predetermined area between the first center area C1 and the side area SA disposed at the left side of the display panel 100 and a predetermined area between the first center area C1 and the side area SA disposed at the right side of the display panel 100 are referred to as second center areas C2. The second center areas C2 are disposed at the center portions between the first center area C1 and the side areas SA.

A distance in each of the second center areas C2 between the first substrate 110 and the second substrate 120 is referred to as a third cell gap GP3. That is, each of the second center areas C2 of the display panel 100 has the third cell gap GP3. The third cell gap GP3 is greater than the second cell gap GP2.

The first cell gap GP1 is the smallest cell gap in the display panel 100 and the third cell gap GP3 is the largest cell gap in the display panel 100.

As shown in FIG. 4, the first cell gap GP1 corresponds to the cell gap in the predetermined area of the first center area C1. In an exemplary embodiment, the first cell gap GP1 of the display panel 100 in the first center area C1 shown in FIG. 4 is in a range of about 2.9 micrometers (μm) to about 2.93 μm. An area, in which the difference in the cell gap is about 0.03 μm or less, may be regarded as one area.

Similar to the first cell gap GP1, the second cell gap GP2 corresponds to the cell gap in the predetermined areas of the side areas SA. The third cell gap GP3 corresponds to the cell gap in the predetermined areas of the second center areas C2.

The cell gap of the display panel 100 is gradually increased from the first cell gap GP1 to the third cell gap GP3 as it goes closer to the second center areas C2 and the distance from the first center area C1 increases.

The cell gap of the display panel 100 is gradually decreased from the third cell gap GP3 to the first cell gap GP1 as it goes closer to the side areas SA and the distance from the second areas C2 increases. This is because the first substrate 110 and the second substrate 120 are coupled to each other by the sealant SLT in areas adjacent to the side areas SA.

In the exemplary embodiment, the second center areas C2 of the display panel 100 have the same cell gap and are symmetrical with each other with respect to the first center area C1. However, the invention is not limited thereto, and the second center areas C2 may have different cell gaps from each other according to a state of the display panel 100.

In an exemplary embodiment, the second center areas C2 may have the different cell gaps and be asymmetrical with each other according to a difference in size between transistors (not shown) disposed on the first and second substrates 110 and 120, a difference in thickness between insulating layers (not shown) disposed on the first and second substrates 110 and 120, or a difference in thickness between electrodes (not shown) disposed on the first and second substrates 110 and 120, for example.

In an exemplary embodiment, the side areas SA may have different cell gaps and be asymmetrical with each other according to the state of the display panel 100. The first center area C1 may have an asymmetrical cell gap with reference to a center of the first center area C1 according to the state of the display panel 100.

FIG. 5 is a view showing liquid crystal molecules of a liquid crystal layer shown in FIG. 3.

Referring to FIG. 5, the first substrate 110 includes a first base substrate SUB1, pixel electrodes PE respectively corresponding to the pixels PX11 to PXnm, and a first alignment layer ALN1. The pixel electrodes PE are disposed on the first base substrate SUB1. The first alignment layer ALN1 is disposed on the first base substrate SUB1 to cover the pixel electrodes PE.

Although not shown in figures, the first base substrate SUB1 includes TFTs each being connected to a corresponding pixel electrode of the pixel electrodes PE. Each of the TFTs is connected to a corresponding gate line of the gate lines GL1 to GLn and a corresponding data line of the data lines DL1 to DLm. As described above, the data voltages are applied to the pixel electrodes PE through the TFTs.

The second substrate 120 includes a second base substrate SUB2, a common electrode CE, and a second alignment layer ALN2. The common electrode CE is disposed on the second base substrate SUB2 and receives a common voltage. The second alignment layer ALN2 is disposed on the common electrode CE.

As described above, the liquid crystal layer LC is driven by the electric field generated between the common electrode applied with the common voltage and the pixel electrodes applied with the data voltages.

Liquid crystal molecules LCM of the liquid crystal layer LC are pre-tilted at a predetermined pretilt angle with reference to a direction substantially vertical to the display panel 100. As described above, the cell gap of the display panel 100 having the curved shape has the cell gap difference. The liquid crystal molecules LCM of the liquid crystal layer LC are pre-tilted at the angle corresponding to the cell gap difference. In detail, the liquid crystal molecules LCM of the liquid crystal layer LC are pre-tilted at the angle proportional to the cell gap.

In an exemplary embodiment, the liquid crystal molecules LCM of the liquid crystal layer LC disposed in the first center area C1 of the display panel 100 are pre-tilted at a first angle corresponding to the first cell gap GP1. The liquid crystal molecules LCM of the liquid crystal layer LC disposed in the side areas SA of the display panel 100 are pre-tilted at a second angle corresponding to the second cell gap GP2. The second angle is greater than the first angle.

The liquid crystal molecules LCM of the liquid crystal layer LC disposed in the second center areas C2 of the display panel 100 are pre-tilted at a third angle corresponding to the third cell gap GP3. The third angle is greater than the second angle.

The first angle corresponds to the smallest angle of pretilt angles of the liquid crystal molecules LCM and the third angle corresponds to the largest angle of pretilt angles of the liquid crystal molecules LCM.

As described above, the cell gap of the display panel 100 is increased from the first cell gap GP1 to the third cell gap GP3 as it goes closer to the second center areas C2 and the distance from the first center area C1 increases. Accordingly, although not shown in FIG. 5, the liquid crystal molecules LCM may be pre-tilted at the angle that gradually increases from the first angle to the third angle as it goes closer to the second center areas C2 and the distance from the first center area C1 increases.

As described above, the cell gap of the display panel 100 is decreased from the third cell gap GP3 to the second cell gap GP2 as it goes closer to the side areas SA and the distance from the second center areas C2 increases. Accordingly, although not shown in FIG. 5, the liquid crystal molecules LCM may be pre-tilted at the angle that gradually decreases from the third angle to the second angle as it goes closer to the side areas SA and the distance from the second center areas C2 increases.

Figure 6A:
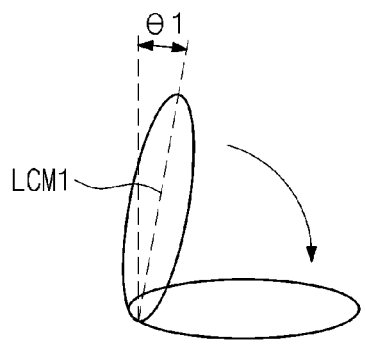
FIGS. 6A to 6C are views showing liquid crystal molecules pre-tilted.
Figure 6B:
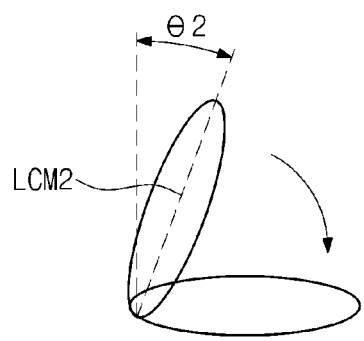
Figure 6C:
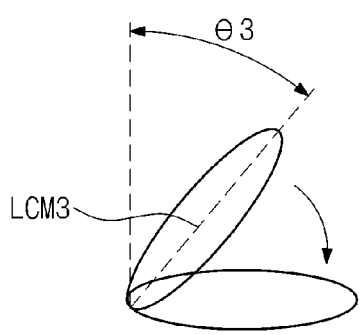

FIGS. 6A to 6C are views showing the liquid crystal molecules pre-tilted.

A first liquid crystal molecule LCM1 shown in FIG. 6A denotes the liquid crystal molecules LCM disposed in the first center area C1 of the display panel 100, a second liquid crystal molecule LCM2 shown in FIG. 6B denotes the liquid crystal molecules LCM disposed in the side areas SA of the display panel 100, and a third liquid crystal molecule LCM3 shown in FIG. 6C denotes the liquid crystal molecules LCM disposed in the second center areas C2 of the display panel 100.

Referring to FIGS. 6A to 6C, the first liquid crystal molecule LCM1 is pre-tilted at the first angle θ1, the second liquid crystal molecule LCM2 is pre-tilted at the second angle θ2, and the third liquid crystal molecule LCM3 is pre-tilted at the third angle θ3. The first, second, and third liquid crystal molecules LCM1, LCM2, and LCM3 are driven in a horizontal direction by the electric field generated between the pixel electrode PE and the common electrode CE.

In this case, a distance, in which the second liquid crystal molecule LCM2 moves to be driven in the horizontal direction, is smaller than a distance in which the first liquid crystal molecule LCM1 moves to be driven in the horizontal direction. That is, the second liquid crystal molecule LCM2, which is pre-tilted at the angle greater than that of the first liquid crystal molecule LCM1, may be driven faster than the first liquid crystal molecule LCM1. Therefore, the second liquid crystal molecule LCM2 has a faster response time than that of the first liquid crystal molecule LCM1.

A distance, in which the third liquid crystal molecule LCM3 moves to be driven in the horizontal direction, is smaller than the distance in which the second liquid crystal molecule LCM2 moves to be driven in the horizontal direction. That is, the third liquid crystal molecule LCM3, which is pre-tilted at the angle greater than that of the second liquid crystal molecule LCM2, may be driven faster than the second liquid crystal molecule LCM2. Therefore, the third liquid crystal molecule LCM3 has a faster response time than that of the second liquid crystal molecule LCM2.

In a conventional flat display panel, the liquid crystal molecules are pre-tilted at the same angle. When the flat display panel is deformed to have the curved surface, the cell gap difference occurs in the display panel.

An intensity of the electric field is proportional to the distance between the pixel electrode PE and the common electrode CE. In an exemplary embodiment, the liquid crystal molecules LCM have the response time proportional to the intensity of the electric field. That is, as the intensity of the electric field becomes stronger, the response time of liquid crystal molecules LCM becomes faster.

When the flat display panel 100 is deformed to the curved display panel 100, the cell gap in the first center area C1 of the flat display panel 100 is decreased to the first cell gap GP1. Thus, the intensity of the electric field in the first center area C1 of the curved display panel 100 becomes stronger than that of the flat display panel 100. As a result, although the liquid crystal molecules LCM1 of the first center areas C1 of the flat display panel 100 and the curved display panel 100, respectively, are pre-tilted at the same angle, the response time of the liquid crystal molecules LCM1 of the liquid crystal layer LC disposed in the first center area C1 of the curved display panel 100 becomes faster than that of the flat display panel 100.

In addition, when the flat display panel 100 is deformed to the curved display panel 100, the cell gap in the second center areas C2 of the flat display panel 100 is increased to the third cell gap GP3. Accordingly, the intensity of the electric field in the second center areas C2 of the curved display panel 100 becomes weaker than that of the flat display panel 100. As a result, although the liquid crystal molecules LCM3 of the second center areas C2 of the flat display panel 100 and the curved display panel 100, respectively, are pre-tilted at the same angle, the response time of the liquid crystal molecule LCM3 of the liquid crystal layer LC disposed in the second center areas C2 of the curved display panel 100 becomes slower than that of the flat display panel 100.

The liquid crystal molecules of the liquid crystal layer LC in the side areas SA of the curved display panel 100 has the response time which is greater than the response time of the liquid crystal molecules LCM1 of the liquid crystal layer LC in the first center area C1 and less than the response time of the liquid crystal molecules LCM3 of the liquid crystal layer LC in the second center areas C2.

Therefore, although the liquid crystal molecules LCM of the flat display panel 100 and the curved display panel 100, respectively, are pre-tilted at the same angle, the response time of the liquid crystal layer LC is changed to be inversely proportional to the deformed cell gap in the curved display panel 100. As a result, the response time of the liquid crystal layer LC may not be constant due to the cell gap difference occurring in the curved display panel 100. In this case, the image is abnormally displayed due to the difference in response time between the liquid crystal molecules LCM of the curved display panel 100. In addition, due to the liquid crystal molecules that are slowly driven, the image displayed in a previous frame may remain as an afterimage.

However, the pretilt angle of the liquid crystal molecules LCM in the illustrated exemplary embodiment is controlled to be proportional to the cell gap. In detail, the pretilt angle of the liquid crystal molecules LCM1 disposed in the first center area C1 of the curved display panel 100, which has the cell gap smaller than that of the flat display panel 100, is decreased. Thus, the response time of the liquid crystal molecules LCM disposed in the first center area C1 of the curved display panel 100, which has the cell gap smaller than that of the flat display panel 100, becomes slow.

In addition, the pretilt angle of the liquid crystal molecules LCM3 disposed in the second center areas C2 of the curved display panel 100, which has the cell gap greater than that of the flat display panel 100, is increased. Accordingly, the response time of the liquid crystal molecules LCM3 disposed in the second center areas C2 of the curved display panel 100, which has the cell gap greater than that of the flat display panel 100, becomes fast. Similarly, the pretilt angle of the liquid crystal molecules LCM2 disposed in the side areas SA of the curved display panel 100 becomes greater than that of the flat display panel 100.

That is, the response time of the liquid crystal molecules, which becomes faster by the deformation of the cell gap of the conventional curved display panel, becomes slower in the curved display panel 100 according to the exemplary embodiment of the invention. In addition, the response time of the liquid crystal molecules, which becomes slower by the deformation of the cell gap of the conventional curved display panel, becomes faster in the curved display panel 100 according to the exemplary embodiment of the invention.

Therefore, when the flat display panel 100 is deformed to the curved display panel 100, the response time of the liquid crystal layer LC may be constant since the liquid crystal molecules LCM are pre-tilted to compensate for the response time even though the cell gap difference occurs in the curved display panel 100. Thus, the image may be normally displayed.

Consequently, the display apparatus 500 may improve the uniformity of the liquid crystal layer LC and improve the reliability thereof.

Figure 7:
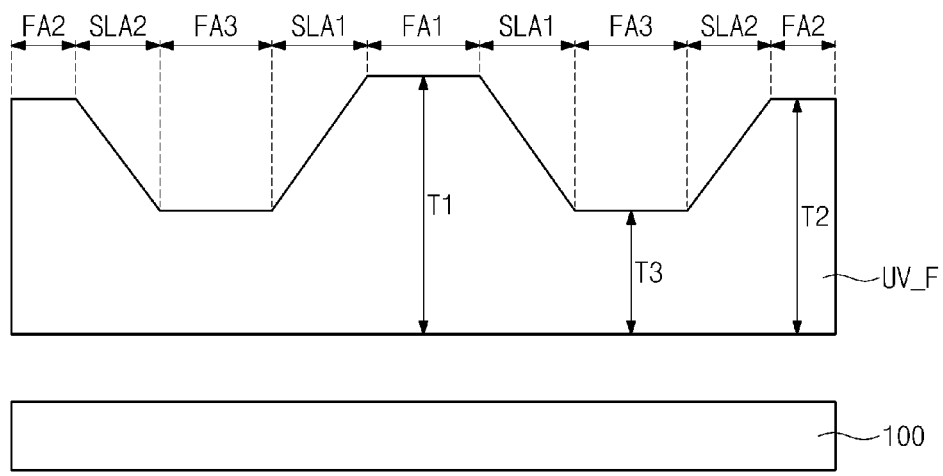
FIGS. 7 to 11 are views explaining an exemplary embodiment of a method of manufacturing a display apparatus according to the invention.
Figure 8:
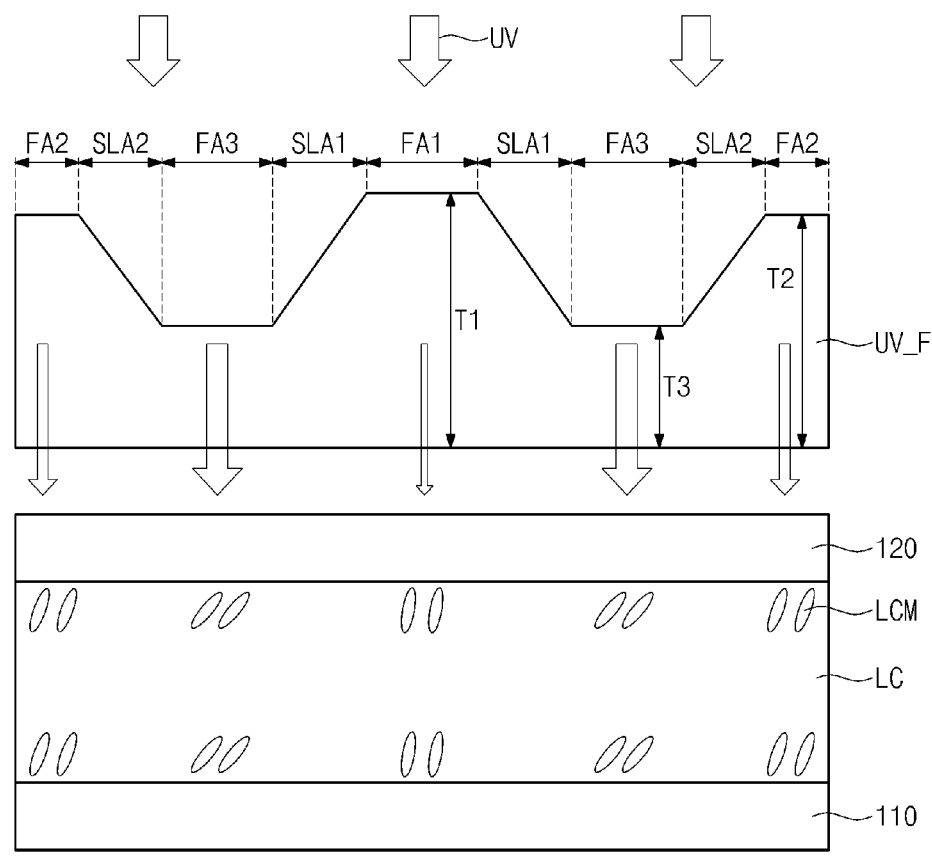
Figure 9:
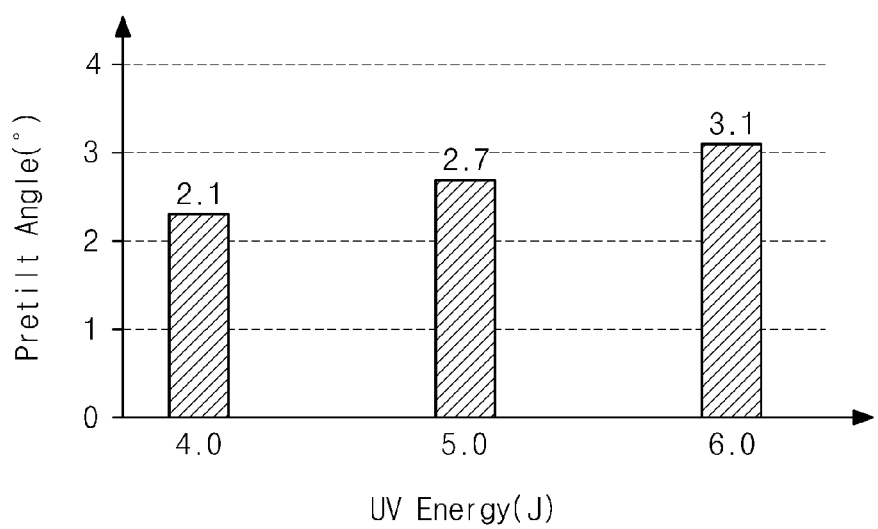
Figure 10:
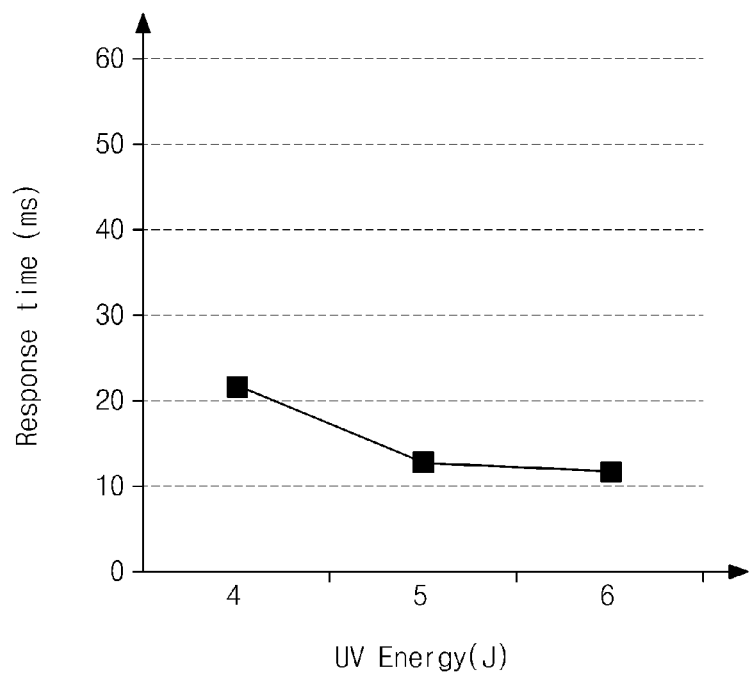

FIGS. 7 to 11 are views explaining a method of manufacturing the display apparatus according to an exemplary embodiment of the invention. FIG. 9 shows the pretilt angle of the liquid crystal molecules LCM according to intensity of ultraviolet ray and FIG. 10 shows the response time of the liquid crystal molecules LCM according to the intensity of the ultraviolet ray.

Referring to FIG. 7, the flat display panel 100 is prepared and an ultraviolet filter UV_F is disposed on the flat display panel 100. In an exemplary embodiment, the ultraviolet filter UV_F may include various materials, such as mercury, titanium dioxide, zinc oxide, iron oxide, magnesium oxide, etc.

The ultraviolet filter UV_F includes a first filter area FA1 corresponding to the first center area C1 of the display panel 100 (refers to FIGS. 3 and 5), second filter areas FA2 corresponding to the side areas SA of the display panel 100, and third filter areas FA3 corresponding to the second center areas C2 of the display panel 100.

That is, the second filter areas FA2 are disposed in each of the left and right predetermined areas of the ultraviolet filter UV_F. In addition, the third filter areas FA3 are respectively disposed in the predetermined area of center portions between the first filter area FA1 and each of the second filter areas FA2.

Areas of the ultraviolet filter UV_F between the first filter area FA1 and the third filter areas FA3 are referred to as first slant areas SLA1. Areas of the ultraviolet filter UV_F between the second filter areas FA2 and the third filter areas FA3 are referred to as second slant areas SLA2.

The ultraviolet filter UV_F has a thickness inversely proportional to the cell gap of the display panel 100. In addition, the thickness of the ultraviolet filter UV_F is set to be inversely proportional to the pretilt angle of the liquid crystal molecules LCM.

In detail, the first filter area FA1 of the ultraviolet filter UV_F has a first thickness T1. The second filter areas FA2 of the ultraviolet filter UV_F have a second thickness T2 smaller than the first thickness T1. The third filter areas FA3 of the ultraviolet filter UV_F have a third thickness smaller than the second thickness T2.

The thickness of the first slant area SLA1 is gradually decreased from the first thickness T1 to the third thickness T3 as it goes closer to the third filter areas FA3 and the distance from the first filter area FA1 increases. The thickness of the second slant areas SLA2 is gradually increased from the third thickness T3 to the second thickness T2 as it goes closer to the second filter areas FA2 and the distance from the third filter area FA3 increases.

Referring to FIGS. 8, 9, and 10, an ultraviolet ray UV is irradiated onto the display panel 100 through the ultraviolet filter UV_F.

Although not shown in figures, in an exemplary embodiment, the liquid crystal layer LC may further include a reactive mesogen, for example. In an exemplary embodiment, the reactive mesogen includes a material or a combination, which includes a mesogen group with a bar shape, a plate shape, or a disc shape, for example, which causes liquid crystalline phase behavior. In an exemplary embodiment, the liquid crystal layer LC includes calamitic liquid crystal molecules or discotic liquid crystal molecules, for example.

The reactive mesogen is polymerized by light, e.g., ultraviolet ray, and the polymerized reactive mesogen may be aligned in accordance with an alignment state of adjacent material thereto. Due to the polymerized reactive mesogen, directivity of the liquid crystal molecules LCM is set and the pretilt angle of the liquid crystal molecules LCM is controlled. Accordingly, the liquid crystal molecules LCM of the liquid crystal layer LC may be pre-tilted at a predetermined angle by the ultraviolet ray UV.

When the ultraviolet ray UV passes through the ultraviolet filter UV_F, the energy (or intensity) of the ultraviolet ray UV is reduced. The energy of the ultraviolet ray UV is reduced inversely proportional to the thickness of the ultraviolet filter UV_F.

In an exemplary embodiment, the reduction in energy of the ultraviolet ray UV passing through the first filter area FA1 is largest and the reduction in energy of the ultraviolet ray UV passing through the third filter areas FA3 is smallest. That is, the ultraviolet ray UV passing through the first filter area FA1 has the smallest energy and the ultraviolet ray UV passing through the third filter areas FA3 has the largest energy.

The ultraviolet ray UV passing through the second filter areas FA2 has the energy greater than the energy of the ultraviolet ray UV passing through the first filter area FA1 and less than the energy of the ultraviolet ray UV passing through the third filter areas FA3.

For the convenience of explanation, the size of the energy of the ultraviolet ray UV is indicated by a thickness of an arrow in FIG. 9.

Although not shown in FIG. 9, the reduction amount in the energy of the ultraviolet ray UV passing through the first slant areas SLA1 is gradually decreased as it goes closer to the third filter area FA3 and the distance from the first filter area FA1 increases. That is, the energy of the ultraviolet ray UV passing through the first slant areas SLA1 is gradually increased as it goes closer to the third filter area FA3 and the distance from the first filter area FA1 increases.

The reduction amount in the energy of the ultraviolet ray UV passing through the second slant areas SLA2 is gradually increased as it goes closer to the second filter areas FA2 and the distance from the third filter areas FA3 increases. That is, the energy of the ultraviolet ray UV passing through the second slant areas SLA2 is gradually decreased as it goes closer to the second filter areas FA2 and the distance from the third filter areas FA3 increases.

As shown in FIG. 9, when the energy of the ultraviolet ray is about 4 joule (J), the liquid crystal molecules LCM are inclined at about 2.3 degrees with respect to the direction substantially vertical to the plane of the display panel 100. When the energy of the ultraviolet ray is about 5 J, the liquid crystal molecules LCM are inclined at about 2.7 degrees with respect to the direction substantially vertical to the plane of the display panel 100. When the energy of the ultraviolet ray is about 6 J, the liquid crystal molecules LCM are inclined at about 3.1 degrees with respect to the direction substantially vertical to the plane of the display panel 100.

Therefore, as the energy of the ultraviolet ray increases, the pretilt angle of the liquid crystal molecules LCM of the liquid crystal layer LC becomes large. As described above, as the pretilt angle of the liquid crystal molecules LCM becomes larger, the response time of the liquid crystal molecules LCM becomes faster.

As shown in FIG. 10, as the energy of the ultraviolet ray UV increases, the response time of the liquid crystal molecules LCM of the liquid crystal layer LC becomes faster. That is, as the energy of the ultraviolet ray UV increases, the pretilt angle of the liquid crystal molecules LCM of the liquid crystal layer LC becomes larger and the response time of the liquid crystal molecules LCM becomes faster.

Thus, the liquid crystal molecules LCM may be pre-tilted to have the pretilt angle corresponding to the size of the energy of the ultraviolet ray UV passing through the ultraviolet filter UV_F. That is, the pretilt angle of the liquid crystal molecules LCM may be controlled to be proportional to the size of the energy of the ultraviolet ray UV.

In more detail, the liquid crystal molecules LCM1 in the first center area C1 of the display panel 100 are pre-tilted at the first angle by the ultraviolet ray UV passing through the first filter area FA1 of the ultraviolet filter UV_F.

The liquid crystal molecules LCM2 in the side areas SA of the display panel 100 are pre-tilted at the second angle by the ultraviolet ray UV passing through the second filter areas FA2 of the ultraviolet filter UV_F.

The liquid crystal molecules LCM3 in the second center areas C2 of the display panel 100 are pre-tilted at the third angle by the ultraviolet ray UV passing through the third filter areas FA3 of the ultraviolet filter UV_F.

The liquid crystal molecules LCM may be pre-tilted at the angle that gradually increases from the first angle to the third angle by the ultraviolet ray UV passing through the first slant areas SLA1 as it goes closer to the second center areas C2 and the distance from the first center area C1 increases.

The liquid crystal molecules LCM may be pre-tilted at the angle that gradually decreases from the third angle to the second angle by the ultraviolet ray UV passing through the second slant areas SLA2 as it goes closer to the side areas SA and the distance from the second center areas C2 increases.

Figure 11:
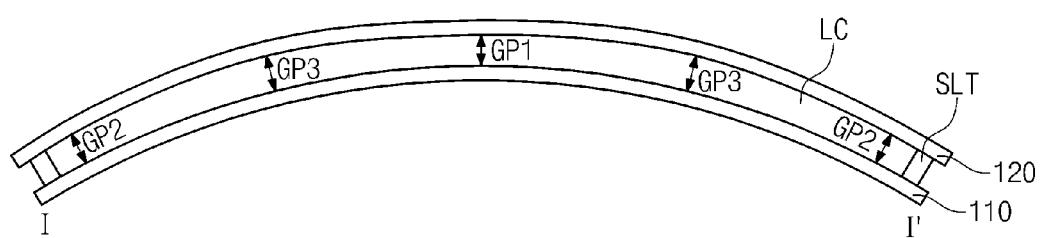

Referring to FIG. 11, the flat display panel 100 is curved in the first direction D1 (refers to FIG. 2) to have a predetermined curvature radius.

When the flat display panel 100 is deformed to the curved display panel 100, the response time of the liquid crystal layer LC may be constant since the liquid crystal molecules LCM are pre-tilted to compensate for the response time even though the cell gap difference occurs in the curved display panel 100. Thus, the image may be normally displayed.

Consequently, the manufacturing method of the display apparatus 500 may improve the uniformity of the liquid crystal layer LC of the curved display panel 100 and improve the reliability of the display apparatus 500.

FIGS. 12A to 12D are views various ultraviolet filters used to manufacture the display apparatus.

Figure 12A:
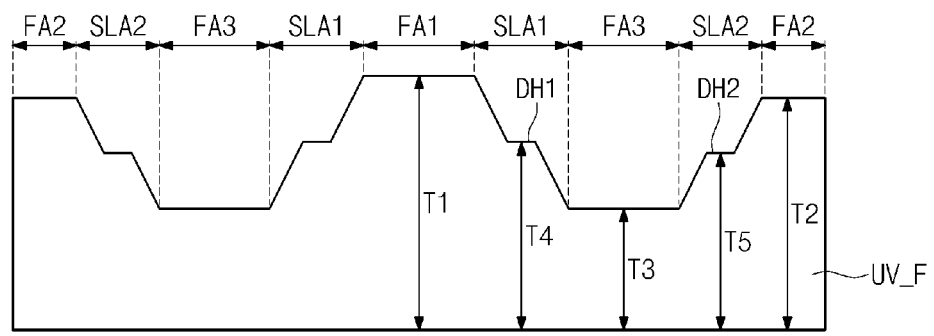
FIGS. 12A to 12D are views various ultraviolet filters used to manufacture the display apparatus.

Referring to FIG. 12A, an ultraviolet filter UV_F includes a first filter area FA1, second filter areas FA2, and third filter areas FA3 similar to the ultraviolet filter UV_F shown in FIG. 7. Accordingly, detailed descriptions on the first, second, and third filter areas FA1, FA2, and FA3 of the ultraviolet filter UV_F will be omitted.

First slant areas SLA1 are defined between the first filter area FA1 and the third filter areas FA3 and second slant areas SLA2 are defined between the third filter areas FA3 and the second filter areas FA2.

A first step difference area DH1 is disposed between the first filter area FA1 and the third filter area FA3 disposed at a left side of the first filter area FA1 and between the first filter area FA1 and the third filter area FA3 disposed at a right side of the first filter area FA1.

The first step difference area DH1 has a fourth thickness T4 less than the first thickness T1 and greater than the third thickness T3. In detail, the fourth thickness T4 has an intermediate value between the first thickness T1 and the third thickness T3.

The thickness of the ultraviolet filter UV_F is gradually decreased between the first filter area FA1 and the first step difference area DH1 and between the first step difference area DH1 and the third filter area FA3 as the distance from the first filter area FA1 increases.

In more detail, the first slant area SLA1 between the first filter area FA1 and the first step difference area DH1 of the ultraviolet filter UV_F has the thickness that gradually decreases from the first thickness T1 to the fourth thickness T4. In addition, the first slant area SLA1 between the first step difference areas DH1 and the third filter areas FA3 has the thickness that gradually decreases from the fourth thickness T4 to the third thickness T3.

A second step difference area DH2 is disposed between the third filter area FA3 disposed at the left side of the first filter area FA1 and the second filter area FA2 and between the third filter area FA3 disposed at the right side of the first filter area FA1 and the second filter area FA2.

The second step difference area DH2 has a fifth thickness T5 less than the second thickness T2 and greater than the third thickness T3. In detail, the fifth thickness T5 has an intermediate value between the second thickness T2 and the third thickness T3. Accordingly, the fifth thickness T5 is smaller than the fourth thickness T4.

The thickness of the ultraviolet filter UV_F is gradually increased between the third filter area FA3 and the second step difference area DH2 and between the second step difference area DH2 and the second filter area FA2 as the distance from the third filter area FA3 increases.

In more detail, the second slant area SLA2 between the third filter area FA3 and the second step difference area DH2 of the ultraviolet filter UV_F has the thickness that gradually increases from the third thickness T3 to the fifth thickness T5. In addition, the second slant area SLA2 between the second step difference areas DH2 and the second filter areas FA2 has the thickness that gradually increases from the fifth thickness T5 to the second thickness T2.

As described above, the display panel 100 has various cell gaps according to the state of the display panel 100. In an exemplary embodiment, when a cell gap having a predetermined value is defined between the first center area C1 and the second center areas C2 of the display panel 100, the cell gap is defined as a fourth cell gap, and the ultraviolet filter UV_F may include the first step difference areas DH1 corresponding to the fourth cell gap of the display panel 100.

In addition, when a cell gap having a predetermined value is defined between the second center areas C2 and the side areas SA of the display panel 100, the cell gap is defined as a fifth cell gap, and the ultraviolet filter UV_F may include the second step difference areas DH2 corresponding to the fifth cell gap.

Figure 12B:
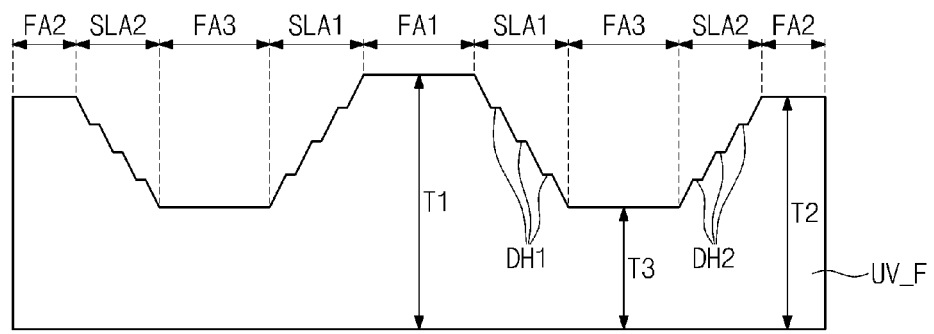

In FIG. 12A, the first step difference areas DH1 have the fourth thickness T4 and the second step difference areas DH2 have the fifth thickness T5, but they should not be limited thereto or thereby. As shown in FIG. 12B, plural step difference areas having various thicknesses may be disposed in the first and second slant areas SLA1 and SLA2.

Referring to FIG. 12B, the ultraviolet filter UV_F includes the first filter area FA1, the second filter areas FA2, and the third filter areas FA3.

The ultraviolet filter UV_F includes first step difference areas DH1 having thicknesses less than the first thickness T1 and greater than the third thickness T3 in each first slant area SLA1. That is, the first slant areas DH1 may have different thicknesses.

In addition, the ultraviolet filter UV_F includes second step difference areas DH2 having thicknesses greater than the third thickness T3 and less than the second thickness T2 in each second slant area SLA2. That is, the second slant areas DH2 may have different thicknesses.

The thicknesses of the first step difference areas DH1 are decreased as the distance from the first filter area FA1 increases. In addition, the thicknesses of the second step difference areas DH2 are increased as the distance from the third filter area FA3 increases.

The thicknesses of the ultraviolet filter UV_F are gradually decreased between the first filter area FA1 and the first step difference area DH1 adjacent to the first filter area FA1, between the first step difference areas DH1, and between the first step difference area DH1 adjacent to the third filter areas FA3 and the third filter areas FA3 as the distance from the first filter area FA1 increases.

The thicknesses of the ultraviolet filter UV_F are gradually increased between the third filter areas FA3 and the second step difference area DH2 adjacent to the third filter area FA3, between the second step difference areas DH2, and between the second step difference area DH2 adjacent to the second filter areas FA2 and the second filter areas FA2 as the distance from the third filter area FA3 increases.

Figure 12C:
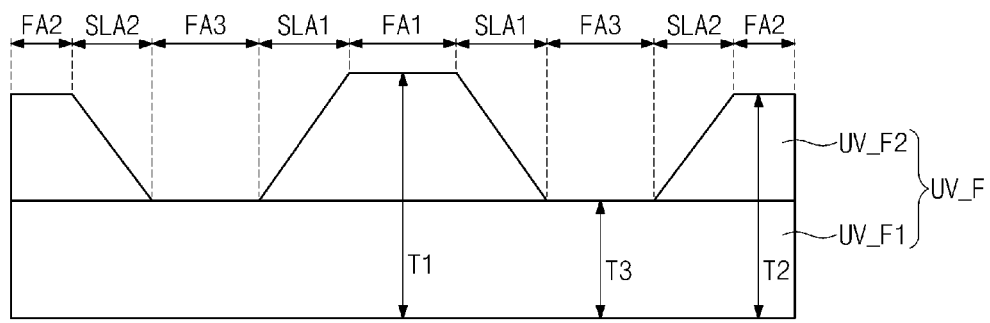

Referring to FIG. 12C, the ultraviolet filter UV_F includes the first filter area FA1, the second filter areas FA2, the third filter areas FA3, the first slant areas SLA1, and the second slant areas SLA2 as those of the ultraviolet filter UV_F shown in FIG. 7. Accordingly, detailed descriptions on the first, second, and third filter areas FA1, FA2, and FA3 and the first and second slant areas SLA1 and SLA2 will be omitted.

The ultraviolet filter UV_F includes a first ultraviolet filter UV_F1 and a second ultraviolet filter UV_F2 disposed on the first ultraviolet filter UV_F1. The first ultraviolet filter UV_F1 has a third thickness T3.

The second ultraviolet filter UV_F2 is disposed in the first and second filter areas FA1 and FA2 and the first and second slant areas SLA1 and SLA2. The first and second filter areas FA1 and FA2 and the first and second slant areas SLA1 and SLA2 are provided by the second ultraviolet filter UV_F2.

A sum of the thickness of the first ultraviolet filter UV_F1 and the thickness of the second ultraviolet filter UV_F2 may be set to the first thickness T1 in the first filter area FA1. A sum of the thickness of the first ultraviolet filter UV_F1 and the thickness of the second ultraviolet filter UV_F2 may be set to the second thickness T2 in the second filter areas FA2.

The thickness of the second ultraviolet filter UV_F2 is gradually decreased in the first slant area SLA1 as it goes closer to the third filter areas FA3 and the distance from the first filter area FA1 increases. The thickness of the second ultraviolet filter UV_F2 is gradually increased in the second slant area SLA2 as it goes closer to the second filter areas FA2 and the distance from the third filter areas FA3 increases.

In an exemplary embodiment, the first and second ultraviolet filters UV_F1 and UV_F2 include different materials. In an exemplary embodiment, the first ultraviolet filter UV_F1 includes a material having lower transmittance with respect to the ultraviolet ray than that of the second ultraviolet filter UV_F2, for example. That is, the intensity of the ultraviolet ray becomes weak due to the first ultraviolet filter UV_F1. However, the materials used to provide the first and second ultraviolet filters UV_F1 and UV_F2 should not be limited thereto or thereby. That is, the first ultraviolet filter UV_F1 may include a material having higher transmittance with respect to the ultraviolet ray than that of the second ultraviolet filter UV_F2.

As described above, when the first and second ultraviolet filters UV_F1 and UV_F2 with different ultraviolet transmittances are applied to the display apparatus 500, the intensity of the ultraviolet ray may be more easily controlled. In an exemplary embodiment, when the ultraviolet filter UV_F shown in FIG. 7 is manufactured by using only one material, the ultraviolet filter UV_F is required to be precisely manufactured for the various heights of the ultraviolet filter UV_F.

However, when different materials are used to manufacture the ultraviolet filter UV_F, the materials are provided in the areas by taking the intensity of the ultraviolet ray required in each area of the ultraviolet filter into consideration. Therefore, the ultraviolet filter UV_F is easily manufactured and the intensity of the ultraviolet ray is easily controlled.

Figure 12D:
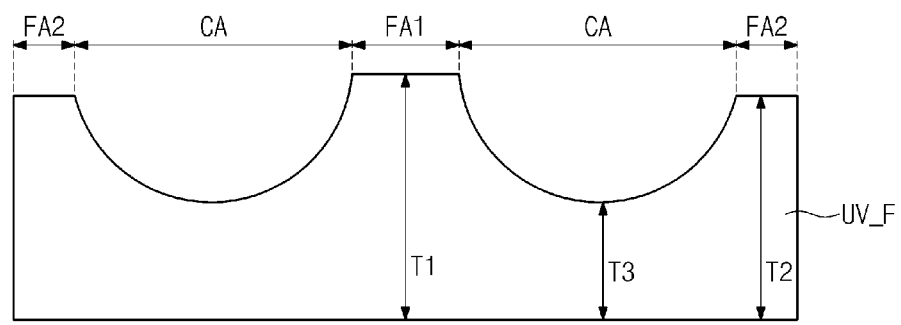

Referring to FIG. 12D, the ultraviolet filter UV_F includes the first filter area FA1 and the second filter areas FA2 as those of the ultraviolet filter UV_F shown in FIG. 7. Thus, detailed descriptions on the first and second filter areas FA1 and FA2 of the ultraviolet filter UV_F shown in FIG. 12D will be omitted.

Areas between the first filter area FA1 and the second filter areas FA2 of the ultraviolet filter UV_F have a concave shape, and thus the areas are referred to as concave areas CA. The ultraviolet filter UV_F has the smallest thickness, e.g., a third thickness T3, at a center portion of each concave area CA.

As described above, the display panel 100 has various cell gap values according to the state of the display panel 100.

In this case, the area between the first filter area FA1 and the second filter areas FA2 of the ultraviolet filter UV_F may have the concave shape in accordance with the cell gap between the first center area C1 and the side areas SA. That is, the ultraviolet filter UV_F includes the concave areas CA disposed between the first filter area FA1 and the second filter areas FA2.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A display apparatus comprising:
 a display panel which has a curved surface in a first direction and a flat surface in a second direction crossing the first direction, and comprises:
 a first substrate;
 a second substrate which faces the first substrate; and
 a liquid crystal layer which is disposed between the first and second substrates and includes liquid crystal molecules pre-tilted at different predetermined angles with reference to a direction substantially vertical to a plane of the display panel,
 wherein the liquid crystal molecules are pre-tilted at the different predetermined angles dependent upon the different cell gaps defined by distances between the first substrate and the second substrate, respectively.

2. The display apparatus of claim 1, wherein the display panel further comprises:
 a first center area disposed at a predetermined area of a center portion of the display panel;
 a side area disposed at a predetermined area of a side portion of the display panel; and
 a second center area disposed at a predetermined area between the first center area and the side area,
 wherein
 the first center area, the second center area and the side area are arranged in the first direction, and
 the cell gaps in the first center area, the side area and the second center area, respectively, are different from each other.

3. The display apparatus of claim 2, wherein the cell gaps comprise:
 a first cell gap corresponding to a cell gap of the first center area;
 a second cell gap corresponding to a cell gap of the side area and greater than the first cell gap; and
 a third cell gap corresponding to a cell gap of the second center area and greater than the second cell gap.

4. The display apparatus of claim 3, wherein the liquid crystal molecules are
 pre-tilted at a first angle corresponding to the first cell gap in the first center area,
 pre-tilted at a second angle corresponding to the second cell gap in the side area, and
 pre-tilted at a third angle corresponding to the third cell gap in the second center area.

5. The display apparatus of claim 4, wherein
 the third angle is greater than the second angle, and
 the second angle is greater than the first angle.

6. The display apparatus of claim 4, wherein
the cell gaps are gradually increased from the first cell gap to the third cell gap as a distance from the first center area increases and a distance to the second center area decreases, and
the cell gaps are gradually decreased from the third cell gap to the second cell gap as a distance from the second center area increases and a distance to the side area decreases.

7. The display apparatus of claim 6, wherein
the liquid crystal molecules are pre-tilted at an angle which gradually increases from the first angle to the third angle as the distance from the first center area increases and the distance to the second center area decreases, and
the liquid crystal molecules are pre-tilted at an angle which gradually decreases from the third angle to the second angle as the distance from the second center area increases and the distance to the side area decreases.

\* \* \* \* \*